Figure 1:
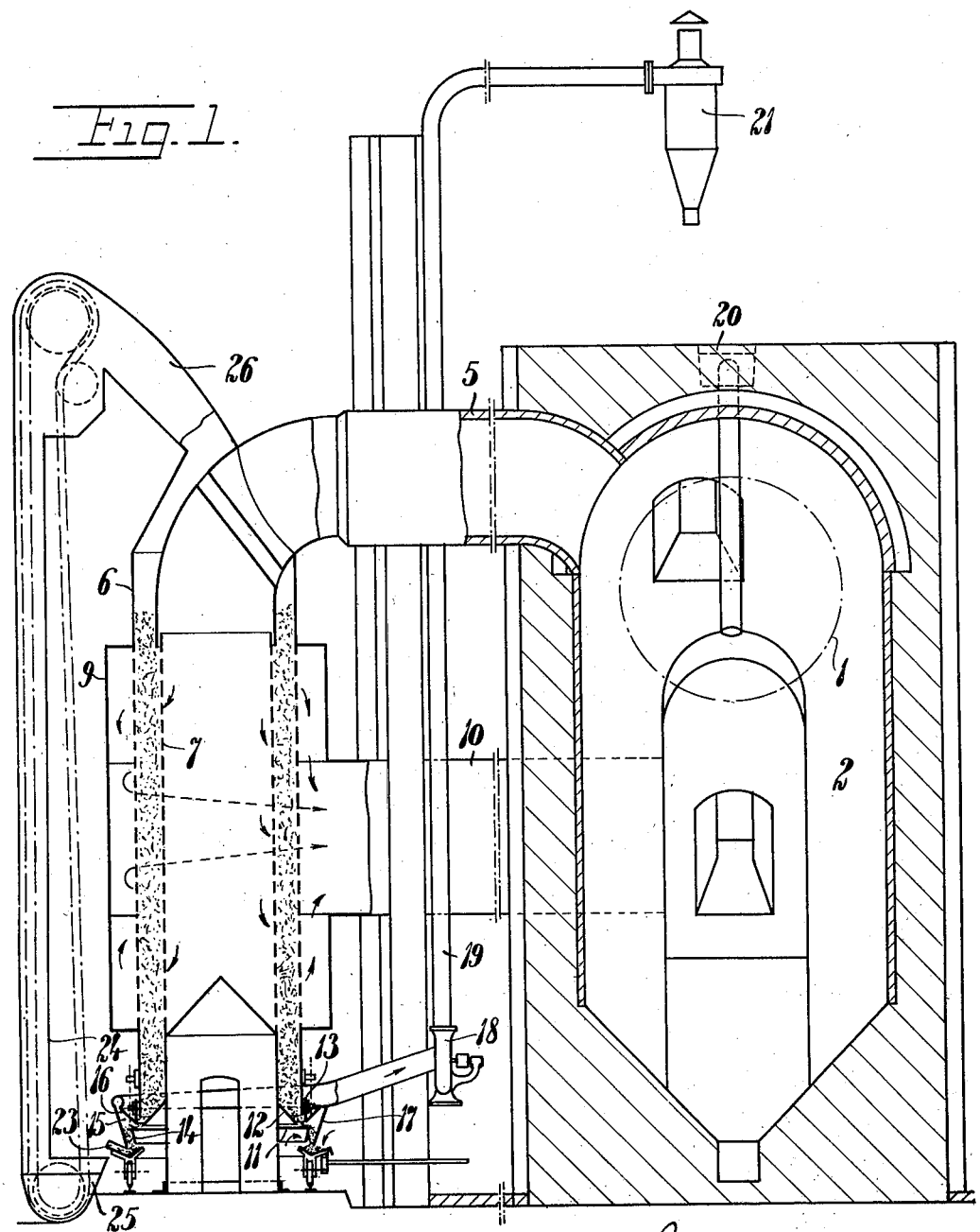

Aug. 11, 1925.

O. NORDSTRÖM 1,549,680

MEANS FOR CATCHING PARTICLES CONTAINED IN GASES

Filed June 14, 1923        2 Sheets-Sheet 1

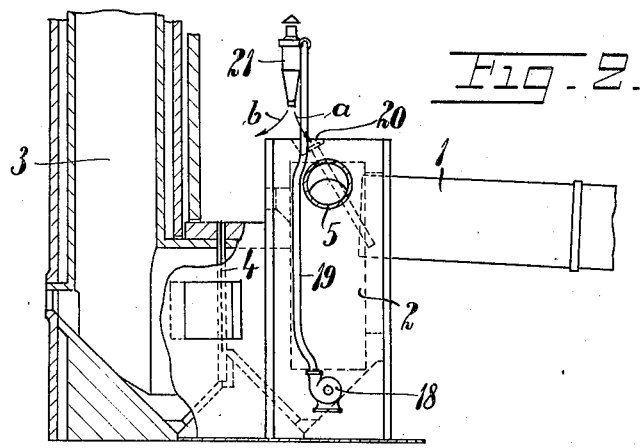
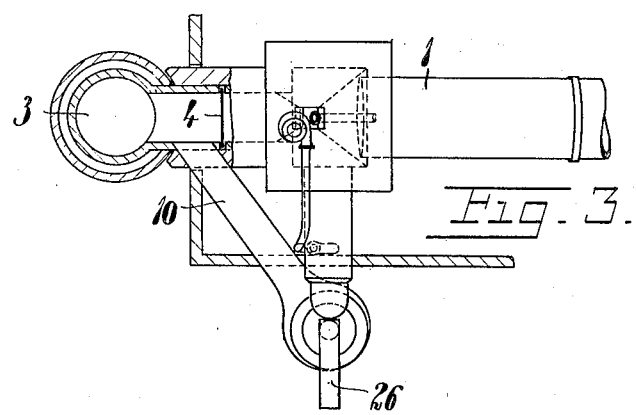
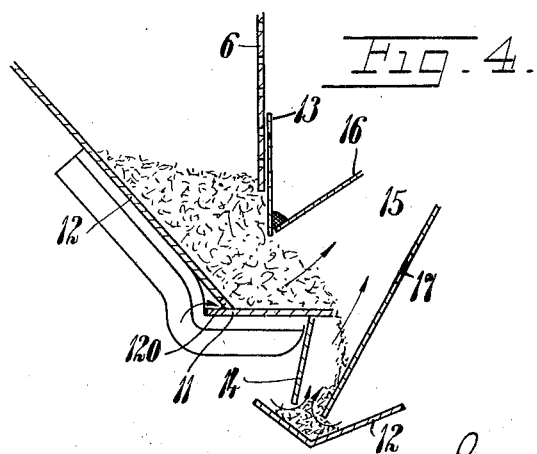

Patented Aug. 11, 1925.

1,549,680

UNITED STATES PATENT OFFICE.

OTTO NORDSTRÖM, OF SUNDSVALL, SWEDEN.

MEANS FOR CATCHING PARTICLES CONTAINED IN GASES.

Application filed June 14, 1923. Serial No. 645,443.

*To all whom it may concern:*

Be it known that I, OTTO NORDSTRÖM, a citizen of the Kingdom of Sweden, residing at Sundsvall, Sweden, have invented new and useful Improvements in Means for Catching Particles Contained in Gases, of which the following is a specification.

The present invention relates to means for catching smoke and particles contained in gases either for again introducing such caught particles into the process in which the gases have been produced, or for recovering such products for special use after enriching them, if necessary.

The method employed according to the present invention is characterized, essentially, by the fact that the gases are forced through a shaft filled with a filtering material adapted to catch the particles contained in the gases, whereupon air is forced or drawn through said filtering material while the latter is in the shape of a comparatively thin layer, the particles caught by the air being then separated from the air in any convenient manner to be either again introduced into the gas producing process or recovered for any other purpose.

In the accompanying drawings I have illustrated a preferred type of plant for carrying out the invention in connection with a cement burning process. It should be noted, however, that the device is not limited to this use but may be applied to the treating of gases from any other process, as, for instance, to the treating of gases derived from mills for manufacturing chloride of limes, particularly where such mills are situated in the neighbourhood of settled tracts. A still further application of the invention is for recovering dust of copper in copper melting mills.

In the drawing, Fig. 1 is a part sectional elevation of the said plant; Fig. 2 is a similar elevation at right angles to that of Fig. 1, and Fig. 3 is a plan view of the plant. Fig. 4 is a vertical section on a larger scale of part of the filtering tower.

With reference to the drawing, the numeral 1 indicates a rotary cement furnace of well known design, 2 is the chimney chamber with which the upper end of the furnace communicates. 3 is the chimney. Mounted between the chamber 2 and the chimney 3 is a damper 4. Extending from the chamber 2 is further a conduit 5 connected at its other end to a filtering tower 6 having an annular drying chamber. Connected to the inner perforated wall 7 of the tower at the upper end thereof is the conduit 5. The outer wall 6 of the filtering tower is likewise perforated along a certain portion of its length and is surrounded by a chamber 9 communicating by way of the conduit 10 with the chimney 3.

The outer wall 6 of the filtering tower terminates at a point above a bottom 11 surrounding the inner wall the distance between said bottom and the lower end of said outer wall being sufficient to provide an outlet for the drying material. Placed immediately above the bottom 11 around the inner wall 7 is a cone shaped plate metal ring 12 forming a slope on which the drying material may slide towards the outlet. Formed at the lower edge of the wall 12 are openings 120. Surrounding the lower portion of the outer wall 6 is a vertically adjustable plate metal cylinder 13 by means of which the area of the outlet opening above the bottom 11 may be adjusted. Depending from the lower side of the bottom 11 is a preferably downwardly converging wall 14. Two inwardly inclined annular walls 16 and 17 converging upwardly relatively to each other are provided surrounding the lower portion of the drying tower in such a way as to form a chamber 15 between themselves in communication with the suction side of a fan-blower 18 the discharge side of which is connected by the conduit 19 to a gas separator 21 mounted above the charging opening 20 of the cement furnace 1. An annular collecting trough 22 having an angular cross section is provided below the lower edges of the walls 14 and 17. Said collecting trough is rotatably mounted and provided with any appropriate kind of driving means. Provided at a suitable point above the collecting trough 22 is a stationary stop bar 23 adapted to scrape off the material carried by the rotary trough. To receive such scraped off material and further convey it provision is made of an elevator 24 having a receptacle 25 for the material removed by the bar 23 and having its delivery conduit 26 communicating with the upper end of the annular filtering chamber of the filtering tower, inasmuch as said conduit 26 forms an extension of the outer wall 6 of the drying tower.

The plant described operates in the following way: The damper 4 when in closed position causes the gases produced in the furnace 1 and which are mixed with dust shaped particles, as fume, derived from the material burned, to a large extent, to pass through conduit 5 into the inner chamber of the filtering tower and then through the apertures of the wall 7 into the annular filtering chamber and from thence through the apertures of the wall 6 out into the chamber 9 to the chimney by way of the conduit 10. Assuming the annular filtering chamber to be filled with a grained material, as grit or the like, moving slowly down through the filtering chamber the said solid particles will precipitate on this material and will move therewith down through the filtering chamber. With the fan-blower in operation a suction of air will result from both sides of the collecting trough 22 and into the space between the walls 14 and 17 and then by way of said space into the chamber 15. At the same time a current of air passes through an opening formed in the bottom 11 and further through the space between the bottom 11 and the adjustable ring 13 and from thence out into the suction chamber 15. Said air currents on their way to the suction chamber will pass the dust mixed material when the latter is in a thin layer in the zigzag-shaped delivery passage. As each part of this passage is traversed by a separate air current it is evident that the air can effectively separate the dust particles from the grains of the grit and carry the former with it. The air mingled with dust particles is carried by the fan-blower 18 up to the separator 21 which will remove the dust from the air and again introduce the former into the furnace, as indicated in Fig. 2, where the arrow *a* represents the way of the dust. The arrow *b* in said figure represents dust rich in potash in case of treating combustion gases containing potash. The dust shaped material carried away from the furnace by the combustion gases is thus completely returned to the cement burning process, or part thereof is recovered as a dust containing more or less potash which may be used, for instance, as a fertilizer.

The grainy material, as grit or the like, serving as a filtering material and which moves successively through the tower and drops on to the collecting trough 22 is removed from the trough by the scraping action of the stop bar 23 and falls down in the receptacle 25 of the elevator 24 by which the material is lifted and again supplied to the filtering chamber at the upper end thereof. The process is consequently carried out fully continuously and with a minimum of material consumption.

In such cases where the raw materials used in manufacturing the cement contain alkali, in which case the caught dust will also contain alkaliferous compounds, a repeated returning of said dust in the described way will result in a successive enriching of the dust as regards its content of potash, so that the dust after having been enriched to a sufficient extent may be used, for instance, as a fertilizer.

It should be noted that the invention may be used for removing particles contained in gases other than the combustion gases from cement furnaces without departing from the principle of the invention.

As regards the apparatus for carrying out the method modifications may also be made. The removing of the dust from the filtering material may, for instance, be effected by means of a sieve instead of a fan-blower and gas separator. Moreover, the connection of the conduit 5 to the filtering tower may take place at the lower end of the tower instead of at the upper end thereof.

What I claim is:—

1. An apparatus for recovering dust particles contained in gases, comprising in combination an inner cylindrical wall surrounding a gas chamber and perforated along a portion of its length, a similarly perforated outer cylindrical wall, a gas chamber surrounding the perforated portion of said outer wall, means to supply granular filtering material to the space between said two walls at the top thereof, a stair-like bottom connected to the lower portion of said inner wall and extending outwardly therefrom beyond the lower end of said outer wall at a distance therefrom, the steps of said stair-bottom being provided with apertures, and an air suction chamber connected to the upper side of said stair-bottom independently of the cylindrical walls.

2. An apparatus for recovering dust particles contained in gases, comprising in combination an inner cylindrical wall surrounding a gas chamber and perforated along a portion of its length, a similarly perforated outer cylindrical wall, a gas chamber surrounding the perforated portion of said outer wall, means to supply a granular filtering material to the space between said two walls at the top thereof, a stair-like bottom connected to the lower portion of said inner wall and extending outwardly therefrom beyond the lower end of said outer wall at a distance therefrom, the steps of said stair-bottom being provided with apertures, means to vary the distance between the lower end of said outer wall and said bottom, and an air suction chamber connected to the upper side of said stair-bottom independently of the cylindrical walls.

3. An apparatus for recovering dust particles contained in gases, comprising in combination an inner cylindrical wall surrounding a gas chamber and perforated along a portion of its length, a similarly perforated outer cylindrical wall, a gas chamber surrounding the perforated portion of said outer wall, means to supply a granular filtering material to the space between said two walls at the top thereof, a stair-like bottom connected to the lower portion of said inner wall and extending outwardly therefrom beyond the lower end of said outer wall at a distance therefrom, the steps of said stair-bottom being provided with apertures, and the lowermost step being rotatably mounted, and an air suction chamber connected to the upper side of said stair-bottom independently of the cylindrical walls.

In testimony whereof I have signed my name.

OTTO NORDSTRÖM.